United States Patent [19]

Agrawal et al.

[11] Patent Number: 5,799,300
[45] Date of Patent: Aug. 25, 1998

[54] METHOD AND SYSTEM FOR PERFORMING RANGE-SUM QUERIES ON A DATA CUBE

[75] Inventors: Rakesh Agrawal; Ching-Tien Ho; Ramakrishnan Srikant, all of San Jose, Calif.

[73] Assignee: International Business Machines Corporations, Armonk, N.Y.

[21] Appl. No.: 764,564

[22] Filed: Dec. 12, 1996

[51] Int. Cl.⁶ .................................................. G06F 17/30
[52] U.S. Cl. .................................................. 707/5
[58] Field of Search ............................. 707/1, 2, 3, 4, 707/5, 6, 100, 200, 503, 504; 345/342; 364/282.1, 282.3; 1/1

[56] References Cited

U.S. PATENT DOCUMENTS

| | | | |
|---|---|---|---|
| 5,257,365 | 10/1993 | Powers et al. | 395/600 |
| 5,359,724 | 10/1994 | Earle | 395/425 |
| 5,404,512 | 4/1995 | Powers et al. | 395/600 |
| 5,404,513 | 4/1995 | Powers et al. | 395/600 |
| 5,499,360 | 3/1996 | Barbara et al. | 707/5 |
| 5,604,854 | 2/1997 | Glassey | 707/503 |
| 5,729,662 | 3/1998 | Rozmus | 1/1 |

OTHER PUBLICATIONS

S. Agarwal et al., On the computation of multidimentional aggregates. In Proc. of the 22nd Int'l Conference on Very Large Databases, pp. 506–521, Mumbai (Bombay), India, Sep. 1996.

B. Chazelle, Lower bounds for orthogonal range searching: II. the arithmetic model. J. ACM, 37(3):439–463, Jul. 1990.

N. Beckmann et al., The R*-tree; an efficient and robust access method for points and rectangles. In Proc. of ACM SIGMOD, pp. 322–331, Atlantic City, NJ, May 1990.

M. Berger et al., An algorithm for point clustering and grid generation. IEEE transactions on Systems, Man and Cybernetics, 21(5):1278–86, 1991.

(List continued on next page.)

*Primary Examiner*—Wayne Amsbury
*Assistant Examiner*—Ruay Lian Ho
*Attorney, Agent, or Firm*—Khanh Q. Tran

[57] ABSTRACT

A method for performing a range-sum query in a database, in which the data is represented as a multi-dimensional data cube, is disclosed. The method comprises the steps of: selecting a subset of the dimensions of the data cube; computing a set of prefix-sums along the selected dimensions, based on the aggregate values in the cube corresponding the queried ranges; and generating a range-sum result based on the computed prefix-sums. Two d-dimensional arrays A and P are used for representing the data cube and the prefix-sums of the data cube, respectively. By maintaining the prefix-sum array P of the same size as the data cube, all range queries for a given cube can be answered in constant time, irrespective of the size of the sub-cube circumscribed by a query, using the inverse binary operator of the SUM operator. Alternatively, only auxiliary information for any user-specified fraction of the size of the d-dimensional data cube is maintained, to minimize the required system storage. The answer to a range query may now require access to some cells of the data cube in addition to the auxiliary information, but the average time complexity is still reduced significantly.

36 Claims, 7 Drawing Sheets

OTHER PUBLICATIONS

B. Chazelle, Lower bounds for orthogonal range searching: II. the arithmetic model. J. ACM, 37(3):439–463, Jul. 1990.

E. F. Codd, Providing OLAP (on–line analytical processing) to user analysis: An IT mandate. Technical report, E. F. Codd and Associates, 1993.

D. Comer, The ubiquitous B–tree. ACM Computing Surveys, 11(2):121–138, Jun. 1979.

B. Chazelle et al., Computing partial sums in multidimensional arrays. In Proc. of the ACM Symp. on Computational Geometry, pp. 131–139, 1989.

S. Chaudhuri et al., Including group–by in query optimization. In Proc. of the 20th Int'l Conference on Very Large Databases, pp. 354–366, Satiago, Chile, Sep. 1994.

J. Gray et al., Data Cube: A relational aggregation operator generalizing group–by, cross–tabs and sub totals. In Proc. of the 12th Int'l Conference on Data Engineering, pp. 152–159, 1996. (also published as a Microsoft Technical Report, as submitted herewith.

V. Harinarayan et al., Implementing data cubes efficiently. In Proc. of the ACM SIGMOD Conference on Management of Data, Jun. 1996.

J.K. Jain et al., Algorithms for clustering data. Prentice Hall, pp. 55–142 1988.

J. Shafer et al., SPRINT: A scalable parallel classifier for data mining. In Proc. of the 22nd Int'l Conference on Very Large Databases, Bombay, India, Sep. 1996.

A. Shukla et al., Storage estimation for multidimensional aggregates in the presence of hierarchies. In Proc. of the 22nd Int'l Conference on Very Large Databases, pp. 522–531, Mumbai (Bombay), India, Sep. 1996.

J. Srivastava et al., TBSAM: An access method for efficient processing of statistical queries. IEEE Transactions on Knowledge and Data Engineering, 1(4), 1989.

P. M. Vaidya, Space–time tradeoffs for orthogonal range queries. In Proc. 17th Annual ACM Symp. on Theory of Comput., pp. 169–174, 1985.

D. E. Willard et al., Adding range restriction capability to dynamic data structures. J. ACM, 32(3):597–617, 1985.

A. Yao, On the complexity of maintaining partial sums. SIAM J. Computing, 14(2):277–288, May 1985.

A. Gupta et al., Aggregate–query processing in data warehouse environments. In Proceedings of the 21st VLDB Conference, pp. 358–369, Zurich, Switzerland, Sep. 1995.

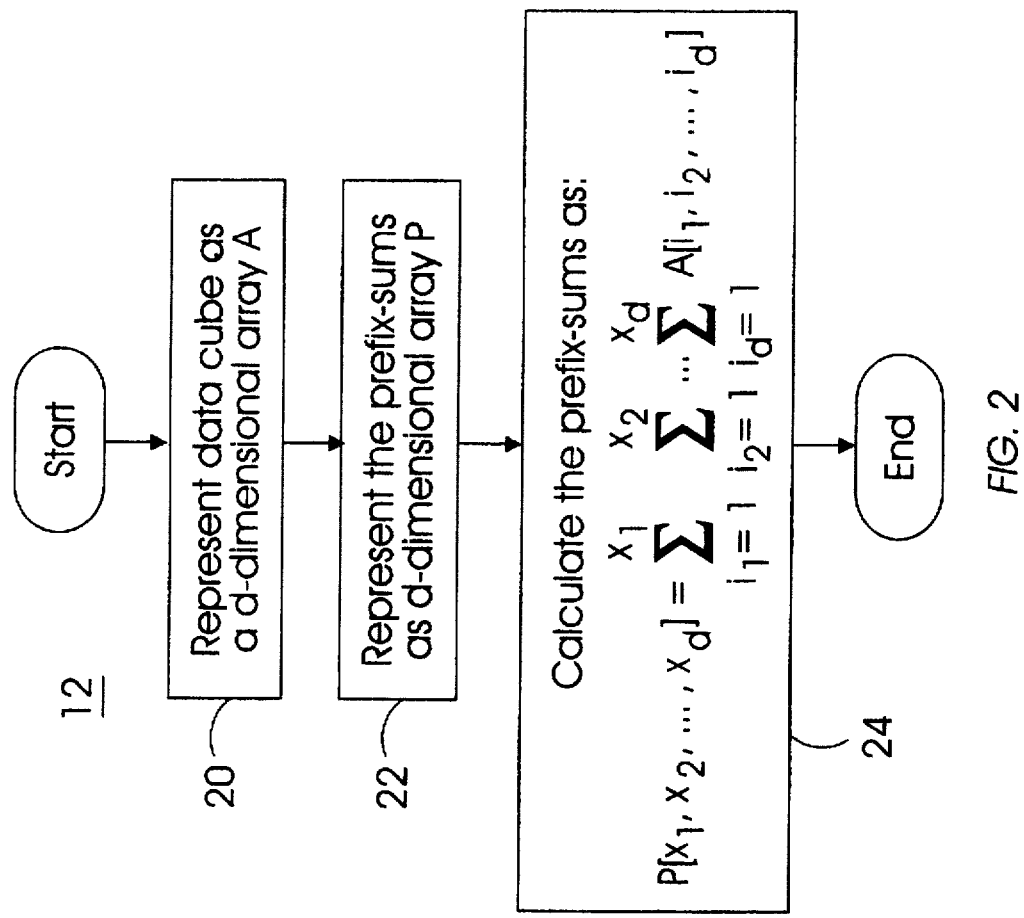

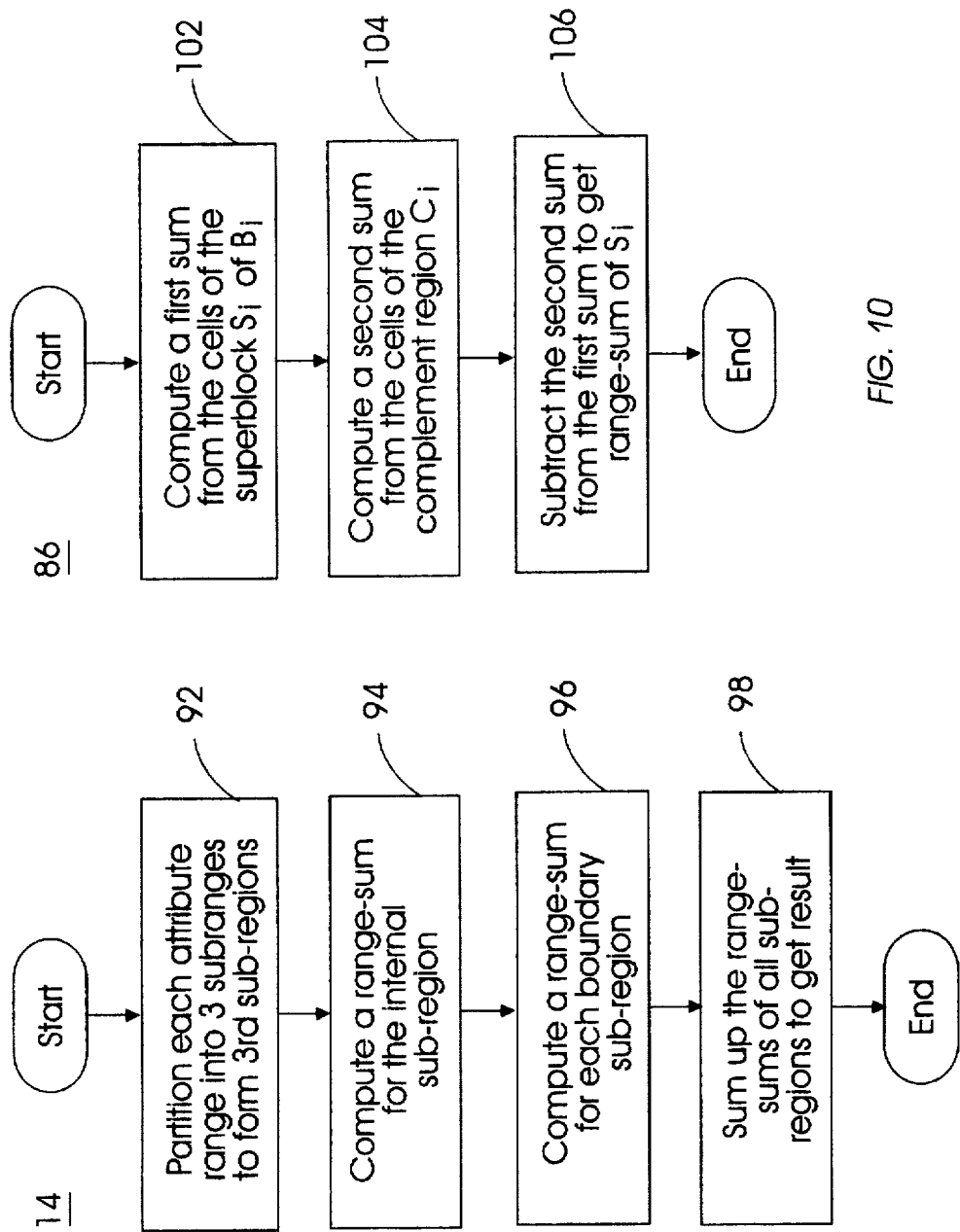

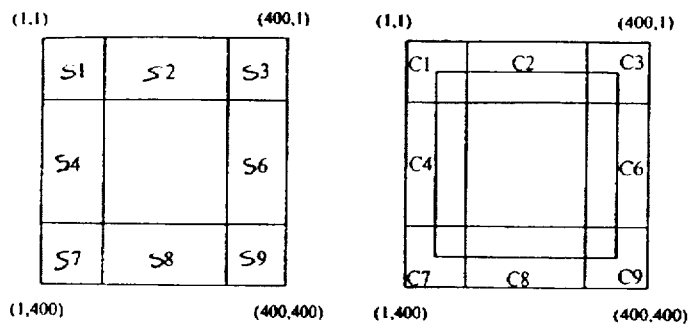
FIG. 11
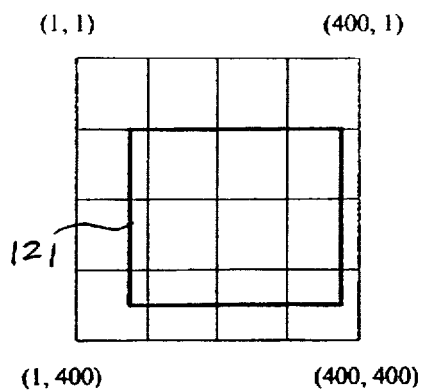
FIG. 12a
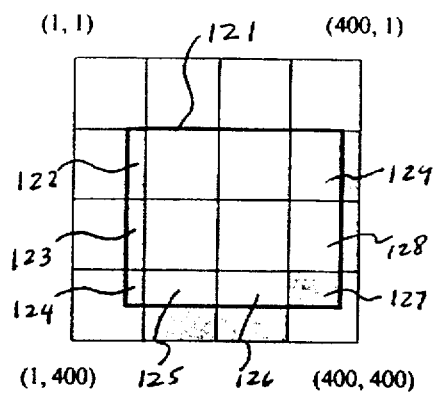
FIG. 12b
| Attribute | 1 | 2 | 3 | 4 | 5 |
|---|---|---|---|---|---|
| $q_1$ | 1 | 100 | 1 | 3 | 1 |
| $q_2$ | 200 | 1 | 100 | 1 | 1 |
| $q_3$ | 500 | 500 | 1 | 1 | 1 |
| $R_j$ | 701 | 601 | 102 | 5 | 3 |
FIG. 13

METHOD AND SYSTEM FOR PERFORMING RANGE-SUM QUERIES ON A DATA CUBE

FIELD OF THE INVENTION

The present invention relates to computer databases, and in particular to a method and system for performing range-sum queries in a database in which data is represented as a multi-dimensional data cube.

BACKGROUND OF THE INVENTION

Recently, On-Line Analytical Processing (OLAP) has emerged as a critical business application of databases in which it allows users to analyze aggregate databases built from data warehouses. The output from this analysis may then be used for synthesizing new data or extracting useful patterns from the database, such as those in data mining applications. An increasingly popular data model for OLAP applications is the multi-dimensional database (MDDB), also known as data cube. The data cube model is described, for example, by J. Gray et al. in "Data Cube: A Relational Aggregate Operator Generalizing Group-bys, Cross-tabs and Sub-totals," Proc. of the 12th Int'l Conf. On Data Engineering, pp. 152–159, 1996.

To build an MDDB from a data warehouse, certain attributes (typically 5 to 10) are selected. Each data record of the MDDB contains a value for each of the data attributes. One of these attributes is chosen as a metrics of interest and referred to as a measure attribute. The remaining attributes, say d of them, are referred to as dimensions or functional attributes. The measure attribute values of all records with the same combination of functional attributes are combined (e.g. summed up) into an aggregate value. Thus, an MDDB can be viewed as a d-dimensional array, indexed by the values of the d functional attributes, whose cells contain the values of the measure attribute for the corresponding combination of the functional attribute values.

For example, a data cube representing data for an insurance company may have four dimensions corresponding to the functional attributes age, year, state, and (insurance) type, respectively. Assuming that the domain of age is from 1 to 100, of year is from 1987 to 1996, of state is the 50 states in U.S., and of type is the set {home, auto, health} representing the type of insurance purchased by a customer. The data cube thus has 100×10×50×3 cells, with each cell containing the total revenue (the measure attribute in this case) for the corresponding combination of age, year, state, and type attribute values.

Furthermore, the above data cube may be extended by augmenting the domain of each functional attribute with an additional value, denoted by "all", to store the aggregated values of the measure attribute in all of the cells along that functional attribute. In the above example, the data cube will be extended to include 101×11×51×4 cells. With this extension to the cube, any query of (age, year, state, type), where the queried value for each attribute is either a single value in its domain or all, can be answered by accessing a single cell in the extended data cube. For instance, the total amount of revenue for the auto insurance in the whole U.S. in 1995 is a query specified by (all, 1995, all, auto), which can be answered in one cell access. Such queries are referred to as singleton queries.

An important class of queries in multi-dimensional databases involves the aggregation of a group of the cells selected from the data cube, where the values of interest for some functional attributes are specified as ranges in their domains. These are referred to as range-sum queries, and are frequently used for numeric attributes with natural semantics in ordering, such as age, time, salary, etc. The specified ranges of the attribute domains are contiguous, and may or may not include the entire domains. For example, consider the same insurance data cube above, a typical range-sum query on the cube may be for finding the total revenue from customers with an age range from 37 to 52, in a year range from 1988 to 1996, in all states of the U.S., and with auto insurance type. To answer this query, we can use precomputed values for "all" in the state domain. However, since the query specifies 16 (but not all) different values in the age domain, and 9 (but not all) different values in the year domain, one needs to access 16×9×1×1 cells in the extended data cube and sum them up before returning the answer. In an interactive application of the data cube, which is the predominant OLAP environment, almost instantaneous response is of paramount importance. It is thus desirable to have a system with a generally constant response time, rather than one in which the response time depends on the volume of the portion of the data cube circumscribed by the query.

One possible solution for processing the range-sum queries is to build a hierarchical tree structure and store in each internal node of the tree the total sum of all respective leaf nodes. For instance, in addition to keeping the total sum over all ages for each combination of (age, year, state, type) in the above example, one may also keep 10 separate range sums, over age 1 to 10, 11 to 20, etc. A range-sum query may be performed by traversing the tree and adding the values at the nodes that fall within the query. However, such a method is quite inefficient in term of response time because many internal nodes of the tree must be summed up in order to answer the query.

In the assignee's pending patent application Ser. No. 08/624,283, a method is described for computing multi-dimensional aggregates across many sets of dimensions, and in particular, the Group-By operators on a set of attributes of the data represented by a data cube. The described method comprises the steps of: (i) generating an operator representing possible Group-By operations on the attributes and hierarchies of possible Group-By operations, using an optimization technique; (ii) computing a first Group-By operation on a first subset of the attributes using the operator; and (iii) computing a second Group-By operation on a second subset of the attributes using the operator, based on the results of the first Group-By computation. Another query method based on Group-By operators is described by S. Chaudhuri et al. in "Including Group-By In Query Optimization," Proc. of the 20th Int'l Conf. on Very Large Databases, pp. 354–366, Chile, 1994. Although such methods are efficient for computing a collection of Group-Bys on the data attributes, for performing Group-By operations in queries, they are not suitable for answering the range-sum queries.

In the paper "Implementing Data Cube Efficiently," Proc. of the ACM SIGMOD Conf. on Management of Data, June 1996. V. Harinarayan et al. describe techniques for efficiently constructing a data cube by determining what subset of the data cube to pre-compute in answering a singleton query. Although these techniques are sufficient for performing singleton queries, they are not suitable in the case of range-sum queries.

The size the system storage required for performing multi-dimensional aggregate operations is addressed by A. Shukla et al. in "Storage Estimation For Multi-dimensional Aggregates In The Presence of Hierarchies," Proc. of the 22nd Int'l Conf. on Very Large Databases, pp. 522–531, India 1996. Here, a method is described for estimating the size of a multi-dimensional aggregate, rather than for computing a range-sum over multiple dimensions of the data cube.

Other methods for processing multi-dimensional aggregates are described, for example, by J. Srivastava et al. in "TBSAM: An Access Method for Efficient Processing of Statistical Queries," IEEE Transaction on Knowledge and Data Engineering, 1(4), 1989). These methods, however, are designed for indexing the pre-computed aggregates or for incrementally maintaining them, but not for efficiently performing the aggregate operations over ranges of the multiple dimensions.

In the field of computational geometry, there is extensive literature on efficient algorithms for handling various types of range queries. See, for example, "Computing Partial Sums In Multidimensional Arrays," B. Chazelle et al., Proc. of the ACM Symposium on Computational Geometry, pp. 131–139, 1989. Most of these algorithms share the following properties: first, the space overhead (e.g., system storage) is mostly non-linear in m, i.e., $O(m (\log m)^{d-1})$, where m is the number of data points. Second, the index domain of each dimension is assumed to be unbounded. Third, mostly the worst-case space and time trade-offs are considered, rather than those for the average case. Lastly, most of them do not take advantage of the inverse function with respect to the aggregate operator.

Therefore, there remains a need for an efficient method for performing range-sum queries in a database in which data is represented as a multi-dimensional data cube. The method allows queries that specify ranges over multiple attribute dimensions to be processed quickly in the average case, has a bounded index domain for each dimension and a space overhead which is linear or sub-linear in the number of data points m, and takes advantage of the existence of an inverse aggregate operator in processing the queries.

SUMMARY OF THE INVENTION

It is an object of the present invention to provide an efficient method for performing range-sum queries on a d-dimensional data cube representing data in an OLAP system in which the query specifies a range for each attribute domain. The query result is computed from the attribute values using an aggregate binary operator (SUM) and its inverse aggregate operator (SUBTRACTION).

It is another object of the present invention to provide a fast method for performing range-sum queries by pre-computing prefix-sums based on the data represented by the original data cube. Any range-sum query can then be quickly answered by accessing and combining $2^d$ appropriate prefix-sums, where d is the number of dimensions for which the ranges have been specified in the query.

It is a further object of the present invention to provide a range-sum query method that minimizes the response time and required system storage space by partitioning the data cube into blocks, and computing and storing the prefix-sums only for these blocks.

It is still a further object of the invention to provide methods for optimizing the performance of range-sum queries by selecting the proper dimensions and block size for pre-computing the prefix-sums.

To achieve these and other objects, the present invention provides a method for performing a range-sum query on a data cube comprising the steps of: selecting a subset of the dimensions of the data cube; computing a plurality of prefix-sums along the selected dimensions based on the respective attribute values of the cells of the data cube; and generating a query result based on the data represented by the prefix-sums. The range-sum result corresponds to a dimensional region of the data cube and is generated from the data using the aggregate binary operator and its inverse aggregate operator. In accordance with the invention, the data cube and the computed prefix-sums are represented as dimensional arrays A and P, respectively. The prefix-sum corresponding to each cell of the array A is calculated by performing an aggregation of the cells along each dimension of the array and is stored in a respective cell in the array P.

Alternatively, the step of computing the prefix-sums includes the steps of: (a) performing one-dimensional prefix-sums along the first dimension for all cells in the array A; (b) storing the one-dimensional prefix-sums into an array $P_1$; and (c) for i=2 to d, performing one-dimensional prefix-sums on array $P_{i-1}$ along dimension i and storing the prefix-sums for array $P_{i-1}$ into an array $P_i$. Any range-sum query can be answered by accessing and combining $2^d$ appropriate prefix-sums, where d is the number of dimensions of the arrays A and P. This compares to a naive algorithm of a time complexity equal to the volume of the query sub-cube, which is at least $2^d$ if the range of every dimension in the query is of size at least two. If system storage is a premium, then the original data cube can be discarded, and singleton queries can be answered by using the pre-computed prefix-sums, as any cell of the data cube can be computed with the same time complexity as a range-sum query.

Furthermore, a time-space trade-off can be made by keeping only a coarser level of prefix-sums instead of all the prefix-sums. The array A is viewed as having multiple d-dimensional blocks, each of size $b_1 \times b_2 \times ... \times b_d$ cells. For each block, the aggregate values of the measure attribute corresponding to the cells in the block are summed into a block sum value, which is stored in a cell of the block. The array A is now reduced to an array A' of size $n_1/b_1 \times n_2/b_2 \times ... \times n_d/b_d$ which contains the block sums of the respective blocks. The above steps of computing and storing one-dimensional prefix-sums are then applied to the contracted array A' to generate a blocked prefix-sum array P'. The query result is derived from the blocked prefix-sum array P' and the original array A by partitioning each queried range into three adjoining sub-ranges (the region corresponding to the query thus includes $3^d$ sub-regions), computing a range-sum for the internal sub-region based on P', computing a range-sum for each boundary sub-region based on P' and A, and adding up the computed range-sums. Any range-sum query can now be answered by accessing and combining $2^d$ or more prefix-sums from P' and some cells of the data cube, from array A.

In another aspect of the invention, an algorithm is described for choosing a subset of the data cube dimensions for which the prefix-sums are computed such that the average-case response time is minimized.

In yet another aspect of the invention, an algorithm is described for choosing a blocking factor (i.e., the block size) to be used for each such subset of the data cube dimensions such that the required system memory is minimized.

Additional objects and advantages of the present invention will be set forth in the description which follows, and in part will be obvious from the description and with the accompanying drawing, or may be learned from the practice of this invention.

BRIEF DESCRIPTION OF THE DRAWINGS

FIG. 1 is a high-level flow chart showing the general operation of the method for performing range-sum queries in a database in accordance with the present invention.

FIG. 2 is a flow chart showing the first preferred embodiment of step 12, for computing the prefix-sums, by summing up the cells along each dimension of the original array A and storing them into a prefix-sum array P.

FIG. 9 is a flow chart showing further details of step 14, for generating a range-sum result, using the blocked algorithm of FIG. 6.

FIG. 10 is a flow chart showing further details of step 96 of FIG. 9, for computing the range-sum for a boundary sub-region, which is part of the range-sum result computation (step 14).

FIG. 11 is a graphical representation of the superblocks and complement regions corresponding to the boundary sub-regions shown in FIG. 8.

FIGS. 12a and 12b illustrate the graphical representations of the prefix-sums for boundary sub-regions computed according to the steps of FIG. 10.

FIG. 13 is an example of the selection of a subset of the data cube dimensions (step 10) using the heuristic algorithm.

DESCRIPTION OF THE PREFERRED EMBODIMENT

Figures 3, 4:
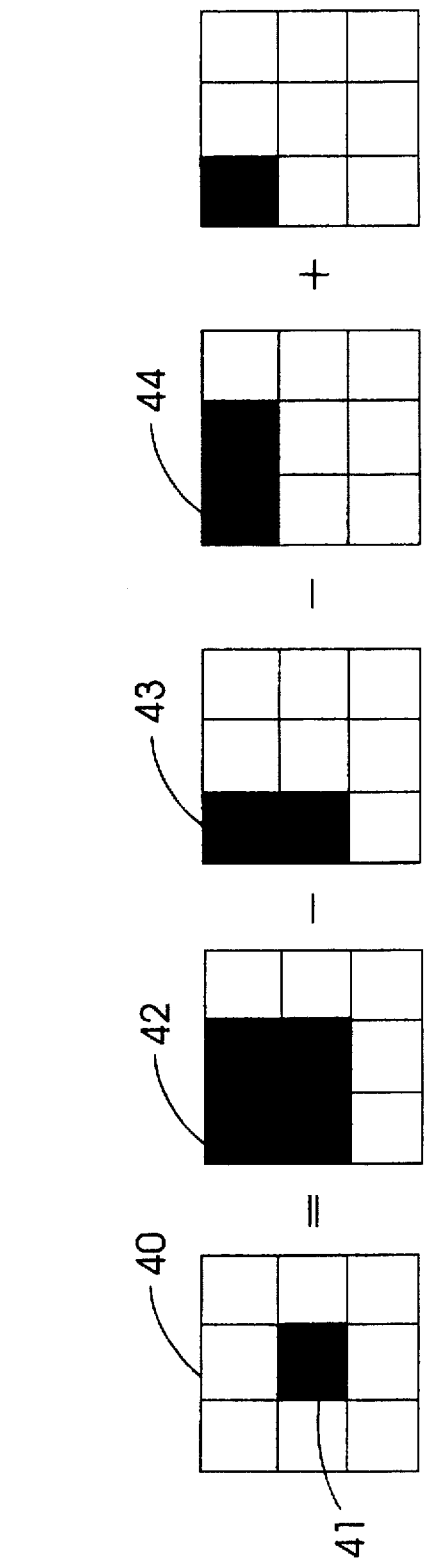
FIG. 3 illustrates an example of the original array A and its corresponding prefix-sum array P, generated from the steps of FIG. 2.
FIG. 4 is a graphical representation of the range-sum computation in a 2-dimensional data cube, according to step 14 of FIG. 1.

The invention is primarily described as a method for performing a range-sum query in a database. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

FIG. 1 is a high-level flow chart illustrating the basic steps of the method for performing a range-sum query in a database, in accordance with the invention. The database typically has numerous data records where each record includes the value of one or more data attributes. One of these attributes is chosen to be the measure attribute while the remaining attributes are the functional attributes. In OLAP applications, the measure attribute of all records with the same combination of functional attributes are combined (e.g. summed up) into an aggregate value. The resulting database thus can be modeled as a d-dimensional array, or data cube, indexed by the values of the d functional attributes, where each dimension of the cube corresponds to a functional attribute. The data cube has many cells, where each cell contains the aggregate value of the measure attribute for the corresponding combination of functional attributes. A range-sum query thus corresponds to d-dimensional region of the data cube, defined by the specified range in each of the d-dimensions.

Generally, the method precomputes some auxiliary information (called prefix-sums) that is then used to answer ad hoc queries at run-time. By maintaining auxiliary information which is of the same size as the data cube, all range queries for a given cube can be answered in constant time, irrespective of the size of the sub-cube circumscribed by a query. Starting at step 10 of FIG. 1, a subset of the data cube dimensions is selected for the prefix-sum computation. At step 12, a plurality of prefix-sums are computed along the selected data cube dimensions, based on the aggregate values corresponding to the ranges of the attribute domains. The result of the range-sum query is then generated in step 14, based on the data represented by the computed prefix-sums.

Although the method steps are described in detail below using the operators SUM (or ADDITION) and SUBTRACTION, i.e., + and −, they are equally applicable to any binary operator $\oplus$ for which there exists an inverse binary operator $\ominus$ such that $a \oplus b \ominus b = a$, for any a and b in the domain. Examples of such an ($\oplus$, $\ominus$) operator pair include (+, −), (bitwise-exclusive-or, bitwise-exclusive-or), (exclusive-or, exclusive-or), and (multiplication, division). The method for performing range-sums is described because SUM (+) is the most prevalent aggregation operation in OLAP applications. Note that the aggregation operators COUNT and AVERAGE for a range can also be derived using the same algorithm because COUNT is a special case of SUM and AVERAGE can be obtained by keeping the 2-tuple (sum, count). Note also that ROLLING SUM and ROLLING AVERAGE, two other frequently used operations in OLAP, are special cases of range-sum and range-average operations, respectively.

FIG. 2 shows further details for the pre-computation of the prefix-sums along the selected dimensions of the data cube (step 12 of FIG. 1). In order to facilitate this computation, the d-dimensional data cube is represented as a d-dimensional array A of size $n_1 \times n_2 \times \ldots \times n_d$, where d is the number of dimensions of the data cube, in step 20. The array model of the data cube is now described.

Let D={1, 2, ..., d} denote the set of dimensions where each dimension corresponds to a functional attribute of the data, then $n_j \geq 2$ for j∈D. For convenience, assume that the array A has a starting index 1 and each array element is referred to as a cell. The total size of the array A is thus equal to $N = \Pi^d_{j=1} n_j$ cells. The range-sum algorithm may be described with respect to the range-sum of array A, where each dimension of the array A is a rank domain of a corresponding attribute (dimension) of the data cube. The attributes of the data cube thus need not be restricted to continuous integer domains. However, for performance reasons, it is desirable that there exists a simple function for mapping the attribute domain to the rank domain. If such function does not exist, then additional storage and time overhead for lookup tables or hash tables may be required for the mapping.

The problem of computing a range-sum query in a d-dimensional data cube can be formulated as finding the range-sum of the array A as follows:

$$\text{Sum}(l_1: h_1, l_2: h_2, \ldots, l_d: h_d) = \sum_{i_1=l_1+1}^{h_1} \sum_{i_2=l_2+1}^{h_2} \cdots \sum_{i_d=l_d+1}^{h_d} A[i_1, i_2, \ldots, i_d]. \quad (1)$$

For notational convenience, the range of all integers $i_j$ is denoted as $l_j: h_j$ where $l_j < i_n \leq h_j$. That is, the integer range excludes the lower bound $l_j$ and includes the upper bound $h_j$. The Region($l_1:h_1, l_2:h_2, \ldots, l_d:h_d$) denotes a d-dimensional space (region) bounded by $l_j < i_j \leq h_j$ in dimension j for all $j \in D$. The volume of a region refers to the number of integer points defined within it. Accordingly, the volume of Region ($l_1:h_1, l_2:h_2, \ldots, l_d:h_d$) is $\Pi^d_{j=1}(h_j - l_j)$. Also, the volume of the range-sum refers to the volume of the region defining the range-sum query. We like to compute the result of $\Sigma A [i_1, i_2, \ldots, i_d]$ for all cells bounded by the d-dimensional region. The range parameters $l_j$ and $h_j$ for all $j \in D$ are specified by the user and typically not known in advance, while the array A is given in advance. For clarity, we first assume that most of the cells in the data cube are non-zero, i.e., a dense data cube, and defer the discussion of sparse data cubes to later in the specification.

Still referring to FIG. 2, in step 22, the computed prefix-sums are represented as a d-dimensional array P which is also of size $n_1 \times n_2 \times \ldots \times n_d$ cells. In a first preferred embodiment of the invention, $N = \Pi^d_{j=1} n_j$ additional cells are needed to store certain pre-computed prefix-sums so that any d-dimensional range-sum can be computed in up to $2^d - 1$ computations steps, based on up to $2^d$ appropriate precomputed prefix-sums. In step 24, the step of computing the prefix-sums includes the step of calculating:

$$P[x_1, x_2, \ldots x_d] = \text{Sum}(0: x_1, 0: x_2, \ldots, 0: x_d) \quad (2)$$

$$= \sum_{i_1=1}^{x_1} \sum_{i_2=1}^{x_2} \cdots \sum_{i_d=1}^{x_d} A[i_1, i_2, \ldots, i_d]$$

where $1 \leq x_j \leq n_j$, $1 \leq j \leq d$ and $n_j$ is the size of dimension j of arrays A and P.

FIG. 3 shows an example of the array A[x, y] and its corresponding array P[x, y] for d=2, $n_1=6$, and $n_2=3$, i.e., a 2-dimensional data cube with the size of the first and second dimensions being 6 and 3, respectively. In accordance with step 24, the prefix-sums of the array P are obtained by calculating:

$$P[x, y] = \text{Sum}(0: x, 0: y) \quad (3)$$

$$= \sum_{i=1}^{x} \sum_{j=1}^{y} A[i, j].$$

For example, the prefix-sum for cell A[x=3, y=2] is 21, which is computed by summing up the values of cells A[1, 1], A[2, 1], A[3, 1], A[1, 2], A[2, 2], and A[3, 2]. The sum 21 is stored in cell P[3, 2] of the prefix-sum array P. Once the prefix-sum array P has been computed, the range-sum of the array A corresponding to the ranges specified in the query can be computed based on array P. In the first preferred embodiment of the method of the invention, the step of generating a range-sum result (step 14 of FIG. 1) includes the step of calculating a range-sum according to the equation:

$$\text{Sum}(l_1: h_1, l_2: h_2, \ldots, l_d: h_d) = \quad (4)$$

-continued $$\sum_{\forall x_j \in \{l_j, h_j\}, \text{for all } j \in D} \left\{ \left( \prod_{i=1}^{d} s(i) \right) * P[x_1, x_2, \ldots, x_d] \right\}$$

where $s(i) = \begin{cases} 1, \text{if } x_i = h_i \\ -1, \text{if } x_i = l_i. \end{cases}$ The left hand side of Equation (4) specifies a range-sum of the array A while the right hand side consists of $2^d$ additive terms, each from a cell of array P with a "+" or "−" sign defined by the multiplication product of all s(i)'s. For notational convenience, let $P[x_1, x_2, \ldots, x_d]=0$ if $x_j=0$ for some $j \in D$, where $D=\{1, 2, \ldots, d\}$ is the set of dimensions. Using Equation (4), any range-sum of array A can be computed based on up to $2^d$ appropriate cells (elements) of the prefix-sum array P.

For example, when d=2, the range-sum Sum($l_1:h_1, l_2:h_2$) can be obtained using the following computation steps:

$$\text{Sum}(l_1:h_1, l_2:h_2)=P[h_1, h_2]-P[h_1,l_2]-P[l_1, h_2]+P[l_1, l_2]. \quad (5)$$

Referring to the prefix-sum array P of FIG. 3, the range-sum Sum(1:3, 2:4) can be computed as:

$$\text{Sum}(2:4, 1:3) = P[4, 3] - P[4, 1] - P[2, 3] + P[2, 1]$$
$$= 40 - 11 - 24 + 8 = 13.$$

This 2-dimensional example may further be illustrated graphically in FIG. 4. In this example, the array A corresponding to the data cube is two-dimensional and represented by area 40. The queried range-sum is represented by area 41. Certain parts of the area 40 needed for generating the range-sum are designated as areas 42, 43, 44, and 45. The range-sum corresponding to the area 41 is then given by:

Sum(area 41)=Sum(area 42)−Sum(area 43)−Sum(area 44)+ Sum(area 45).

Figure 5:
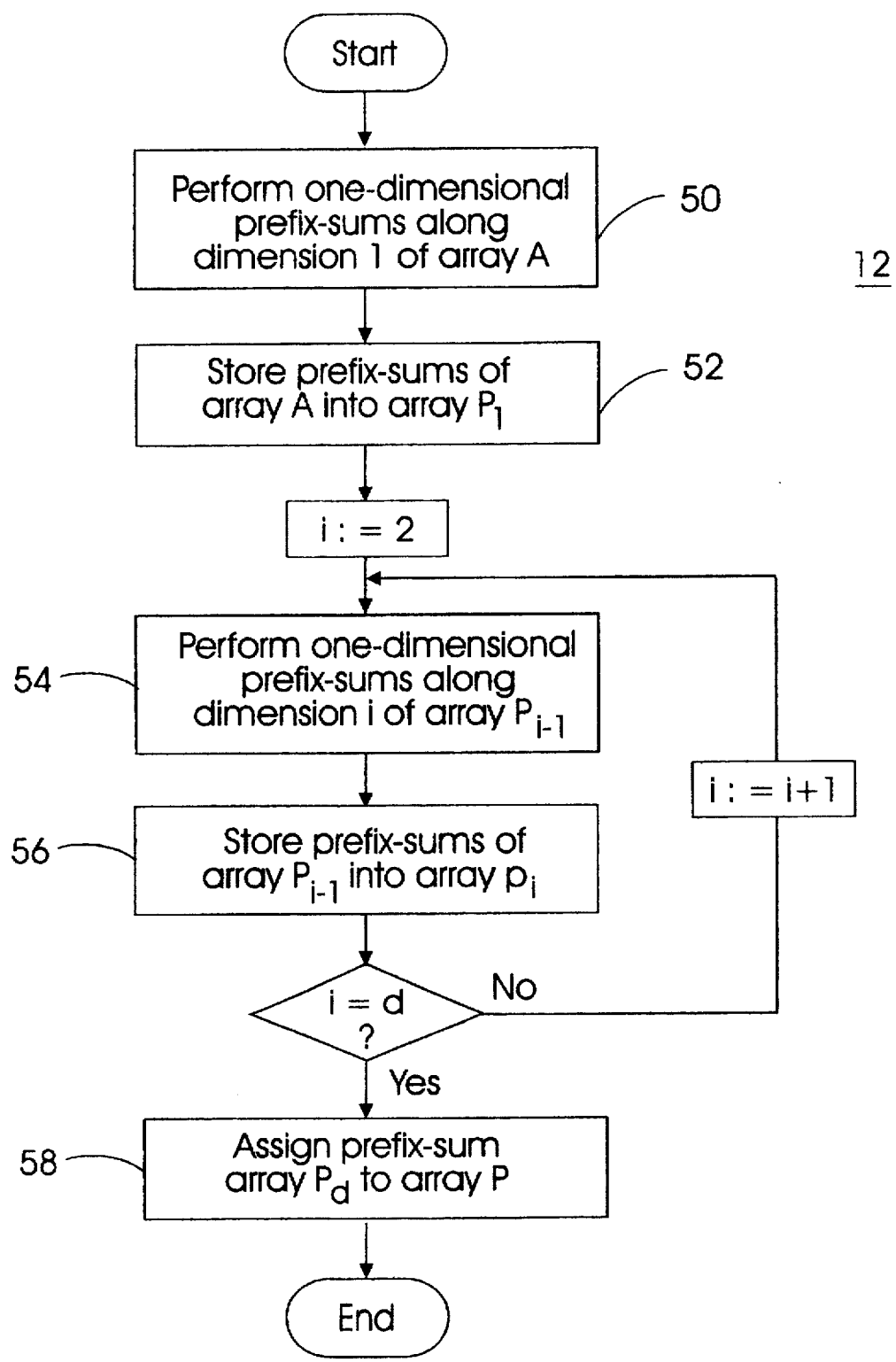
FIG. 5 is a flow chart showing the second preferred embodiment of step 12, for computing the prefix-sums, by iteratively performing one-dimensional prefix-sums along each dimension of the prefix-sum array P to obtain better execution time.

FIG. 5 is a flow chart showing a second preferred embodiment of step 12, for computing the prefix-sums, with a better time complexity of dN steps. The algorithm of the second embodiment is performed in d phases. During the first phase, one-dimensional prefix-sums of array A along dimension 1, for all cells of array A, are performed in step 50. These prefix-sums are stored in the array P (denoted $P_1$) in step 52. During the i-th phase, for all $2 \leq i \leq d$, of the prefix-sum computation, one-dimensional prefix-sums along dimension i of the array $P_{i-1}$ (the output from previous phase) are performed and stored back to P (denoted $P_i$). Note that only one copy of the array P is actually needed because the same array P can be reused during each phase of prefix-sum computation. However, for clarity of the description, the intermediate prefix-sums are shown as being formed (step 54) from the prefix-sum array $P_{i-1}$ of the previous iteration and stored into an array $P_i$ (step 56). Eventually, the last prefix-sum array $P_d$ is assigned to P, in step 58. The correctness proof of the algorithm is straightforward because after d phases, each P[$y_1, y_2, \ldots, y_d$] contains the sum of A[$x_1, x_2, \ldots, x_d$]'s for all $1 \leq x_j \leq y_j$, $j \in D$.

As a consideration of the system storage, it is possible to discard the array A once array P is computed, thus preserving the same total required storage. This is because any cell of A can be viewed as a special case of the range-sum A[$x_1, x_2, \ldots, x_d$]=Sum($x_1-1:x_1, x_2-1:x_2, \ldots, x_d-1:x_d$). Thus, whenever A[$x_1, x_2, \ldots, x_d$] is accessed later, we compute it on the fly from up to $2^d$ cells of P, as opposed to accessing a single cell of A. This provides a space-time trade-off, especially when d is small. A different space-time trade-off can also be made by keeping both the prefix-sums at a coarser grain level and the entire array A, as discussed below for the blocked algorithm.

The Blocked Algorithm

In a third preferred embodiment of the method of the invention, a simple space-time trade-off is made by partitioning the data cube into multiple blocks using block factors $b_j$, for all $j \in D$, and keeping only the prefix-sums at a coarser-grained (blocked) level. More specifically, the prefix-sums are kept only when every index of dimension j is either a multiple of $b_j$ or the last index of the dimension j for all $j \in D$, i.e., $P[i_1, i_2, \ldots, i_d]$ where $i_j \mod b_j = 0$ or $i_j = n_j$, for all $j \in D$. Thus, for every d-dimensional block of size $b_1 \times b_2 \times \ldots \times b_d$, only one prefix-sum is precomputed, asymptotically. For example, in the two-dimensional case, only $P[b_1, b_2]$, $P[b_1, 2b_2]$, $\ldots$, $P[b_1, n_2]$, $P[2b_1, b_2]$, $P[2b_1, 2b_2]$, etc., are computed.

We refer to the algorithm with $b_j > 1$ for some $j \in D$ as the blocked algorithm and the algorithm described above in reference to FIGS. 2–5, with $b_j = 1$ for all $j \in D$, as the basic algorithm. Also, the prefix-sum array will still be P and further assume that only $P[i_1, i_2, \ldots, i_d]$'s where $i_j \mod b = 0$ or $i_j = n_j$, for all $j \in D$, are defined. (In a practical implementation, the sparse array P of size N and density $\approx 1/(b_1 \times b_2 \times \ldots \times b_d)$ will be packed to a dense array of size about $N/(b_1 \times b_2 \times \ldots \times b_d)$.) The selection of the block factors $b_j$'s will be described later in the specification.

Figure 6:
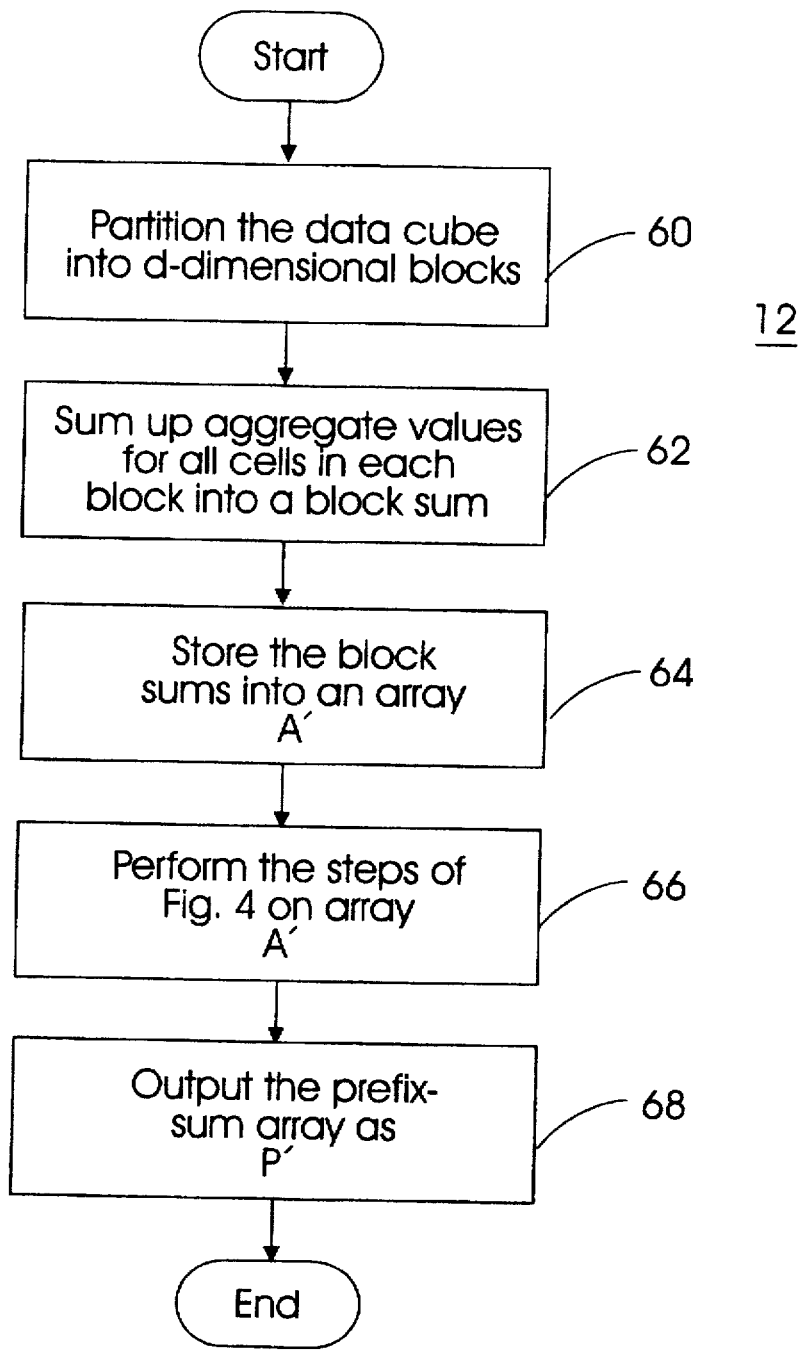
FIG. 6 is a flow chart showing further details of step 12, for computing the prefix-sums, by partitioning the data cube into blocks and computing the prefix-sums only for the blocks (referred to as the blocked algorithm).

FIG. 6 is a flow chart showing further details for the step of computing the prefix-sums (step 12), for the blocked algorithm. Starting at step 60, given a d-dimensional data cube and predetermined block factors $b_j$'s, the data cube is partitioned into a plurality of d-dimensional blocks of size $b_1 \times b_2 \times \ldots \times b_d$. The prefix-sums needed for performing a range-sum query $\text{Sum}(l_1:h_1, l_2:h_2, \ldots, l_d:h_d)$ are computed in two phases. In the first phase, for each block, the aggregate values of the data cube corresponding to all the cells in the block are summed into a block sum, as shown by step 62. This block sum value is stored into a new array A', as shown by step 64. After the block sums are generated for all the blocks, the array A of size $n_1 \times n_2 \times \ldots \times n_d$ is effectively reduced by a factor of $b_j$ on every dimension j and becomes the array A' of size $n_1/b_2 \times n_2/b_2 \times \ldots \times n_d/b_d$, which contains the respective block sums of the blocks. Note that the array A may be reused as A' by storing the computed block sum in one of the cells, for each block.

In the second phase of the blocked prefix-sum computation, the steps for computing the prefix-sums of FIG. 5 are applied to the array A', as shown by step 66 of FIG. 6. In other words, the steps 50–58 are executed with the input array A substituted by the array A'. The resulting prefix-sum array P is output as a blocked prefix-sum array P' in step 68. It can be seen that this method for computing the blocked prefix-sums is performed in no more than $N+dN/(b_1 \times b_2 \times \ldots \times b_d) = (1+\epsilon)N$ steps, where $\epsilon = d/(b_1 \times b_2 \times \ldots \times b_d)$ converges to 0 when $b_j$'s or d increases and requires no additional buffer space than the blocked prefix-sum array.

Figures 7, 8:
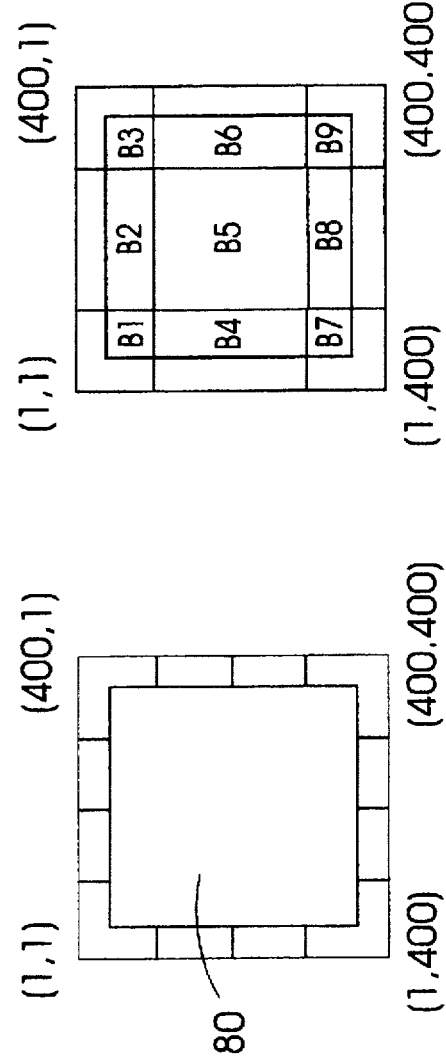
FIG. 7 is an example of the blocked prefix-sum array P with a block factor b=2, generated by the steps of FIG. 6.
FIG. 8 is a graphical representation of the sub-regions in the computation of the prefix-sum for a boundary sub-region, according to the steps of FIG. 6.

FIG. 7 illustrates an example of the blocked prefix-sum array P' with d=2, $n_1=6$, $n_2=3$, and $b_1=b_2=2$. Based on the blocked algorithm, only the prefix-sums for cells P'[2, 2], P'[2, 3], P'[4, 2], P'[4, 3], P'[6, 2] and P'[6, 3] are computed, as shown.

The computation of the range-sum (step 14 of FIG. 1) when the blocked algorithm is used is now described. We first define some other notations. For all $j \in D$, let $l_j'' = b \cdot \lceil l_j/b \rceil$.

$l_j' = b\lceil l_j/b \rceil$, $h_j' = b\lfloor h_j/b \rfloor$, and $h_j'' = \min(b\lceil h_j/b \rceil, n_j)$. Thus, $l_j'' \leq l_j \leq l_j'$ and $h_j' \leq h_j \leq h_j''$. However, $l_j < h_j$ does not imply $l_j' \leq h_j'$. (Consider $l_1=9$, $h_1=11$, and $b=4$ for example.) In the following, we consider two cases separately: case 1 where $l_j' \leq h_j'$ for all $j \in D$, and case 2 where $l_j' > h_j'$ for some $j \in D$.

Case 1 ($l_j' \leq h_j'$ for all $j \in D$)

To compute $\text{Sum}(l_1:h_1, l_2:h_2, \ldots, l_d:h_d)$, we will decompose its region into $3^d$ disjoint sub-regions as follows. Let $R_j = (l_j:l_j', l_j':h_j', h_j':h_j)$, be a set of three adjoining ranges. Then, for all $j \in D$, $$\text{Sum}(l_1:h_1, l_2:h_2, \ldots, l_d:h_d) = \sum_{\forall r_j \in R_j} \text{Sum}(r_1, r_2, \ldots, r_d). \quad (6)$$

Intuitively, the range in each dimension is partitioned into three adjoining sub-ranges where the middle sub-range is properly aligned with the block structure. Thus, the Cartesian product of these d dimensions will form $3^d$ disjoint sub-regions. Note that some of the $3^d$ regions may be empty regions if $(l_j \mod b_j) = 0$ or $(h_j \mod b_j) = 0$ or $h_j = n_j$ or $l_j' = h_j'$ for some j. For convenience, the region $(r_1, r_2, \ldots, r_d)$, for which $r_j = l_j':h_j'$ for all $j \in D$, is referred to as an internal region. All the other $3^d - 1$ regions are referred to as boundary regions.

For example, FIG. 8 illustrates a pictorial representation of the query Region(50:350; 50:350) for $b_1 = b_2 = 100$. The query region is shown as the shaded area 80 and includes $3^2 = 9$ sub-regions, denoted B1 through B9 with B5 being the internal sub-region, B1–B4 and B6–B9 being the boundary sub-regions.

To compute the total range-sum for a given range-sum query, we first compute the range-sum for the internal sub-region. Since this sub-region is properly aligned with the block structure, its range-sum can be computed in up to $2^d - 1$ steps based on up to $2^d$ appropriate cells of the blocked prefix-sum array P' only. Then, the range-sums for all $3^d - 1$ boundary sub-regions are computed and added to the range-sum for the internal sub-region to obtain the result.

FIG. 9 is a flow chart showing the further details of the step 14 of FIG. 1, for generating a range-sum result, for case 1 of the blocked algorithm. At step 92, for each dimension of the data cube, the range of values of the data attribute corresponding to this dimension is partitioned into three adjoining sub-ranges such that the middle range is properly aligned with the block structure. In other words, the middle range is $(l_j':h_j')$. The region of the data cube corresponding to the range-sum query thus consists of $3^d$ disjoint sub-regions: an internal sub-region and $3^d - 1$ boundary sub-regions $B_i$'s. At step 94, a range-sum for the internal sub-region is computed based on the blocked prefix-sums stored in array P'. Next, at step 96, a range-sum for each boundary sub-region $B_i$ is computed based on the data in the arrays A and P', which contain the data cube values and the blocked prefix-sums, respectively. Finally, at step 98, the range-sums for all the $3^d$ sub-regions computed in steps 94 and 96 are summed up to arrive at the range-sum result.

For each boundary sub-region $B_i$, its range-sum may be computed (step 96) using two methods. First, the range-sum can be obtained by simply summing up all the cells of the array A that correspond to $B_i$. Alternatively, it can be computed using the steps shown in the flow chart of FIG. 10. Starting with step 102, a first sum is computed from the cells of the array A that correspond to a superblock $S_i$ of the boundary sub-region $B_i$. The superblock $S_i$ is defined as a minimum collection of the blocks that includes the sub-region $B_i$. At step 104, a second sum is computed from the cells of the array A that correspond to a complement region $C_i$ of the boundary sub-region $B_i$. The complement region $C_i$ of $B_i$ is the difference between the superblock $S_i$ and the sub-region $B_i$. The range-sum for the sub-region $B_i$ is next obtained in step 106 by subtracting the second sum from the first sum. The range-sum for a superblock region can be computed in $2^d-1$ steps using the array P' only. To minimize the time complexity, the first method is preferred when the volume (i.e., the number of cells) of $B_i$ is smaller than or equal to the volume of its complement region plus $2^d-1$ cells; and the second method in used in other cases. Note also that the choice of method is made independently for each boundary sub-region.

FIG. 11 illustrates the superblocks and complement regions corresponding to the boundary sub-regions B1–B4 and B6–B9 of FIG. 8. The superblocks of the sub-regions B1–B4 and B6–B9 are denoted S1–S4 and S6–S9, respectively, while the complement regions of the sub-regions B1–B4 and B6–B9 are denoted C1–C4 and C6–C9, respectively.

FIGS. 12a and 12b show an example of using the first and second methods for computing the range-sums for different boundary sub-regions. In particular, FIG. 12a illustrates a graphical representation of the query Sum(75:375, 100:355), shown by area 121. In FIG. 12b, a graphical representation of the same query is shown in which the range-sums for the boundary sub-regions 122, 123, 124, and 127 are computed using the first method, while the boundary sub-regions 125, 126, 128 and 129 are computed using the second method.

Case 2 ($l'_j > h'_j$ for some $j \in D$)

The algorithm for generating the range-sum result described above for case 1 cannot be directly applied to the case 2. A simple modification to the step of partitioning the attribute range is necessary as follows. Let $R_j=\{l_j:l'_j, l'_j:h'_j, h'_j:h_j\}$, be a set of three adjoining ranges as before, if $l'_j \leq h'_j$, and let $R_j=\{l_j:h_j\}$ otherwise. Then, for all $j \in D$, $$\text{Sum}(l_1:h_1, l_2:h_2, \ldots, l_d:h_d) = \sum_{\forall r_j \in R_j} \text{Sum}(r_1, r_2, \ldots, r_d) \quad (7)$$

The definition of superblock region is similarly modified as Region($B_1, B_2, \ldots, B_d$), where for all $j \in D$, $$B_j = \begin{cases} l_j'':l_j', & \text{if } r_j = l_j:l_j' \\ r_j, & \text{if } r_j = l_j':h_j' \\ h_j':h_j'', & \text{if } r_j = h_j':h_j \\ l_j'':h_j'', & \text{if } r_j = l_j:h_j. \end{cases} \quad (8)$$

With these two modifications, the algorithm described for the case 1 above can now be applied to the case 2 as well.

In an OLAP environment, users typically search for trends, patterns, or unusual data behavior by issuing queries interactively. Thus, users may be satisfied with an approximate answer for a query if the response time can be greatly reduced. Accordingly, based on the block algorithm, one can implement the range-sum algorithm so that an upper bound and a lower bound on the range-sum are returned to users first, followed by a real sum when the final computation is completed. This is because each bound can be derived in at most $2^d-1$ computation steps.

In another aspect of the invention, the above described method for performing range-sum queries may be further optimized by selecting the proper data cube dimensions for the prefix-sum computation and the block factors. For some datasets, it may be beneficial to not calculate prefix-sums along some dimensions of the cube to reduce the average-case time. Assume that the basic algorithm is used (i.e., b=1), it may be beneficial with respect to performance to select a subset of the dimensions upon which the prefix-sum array P is generated. The selection of such dimensions, in accordance with the invention, is now described.

Consider an example with d=3 dimensions, labeled $d_1, d_2$, and $d_3$. If all range-sum queries specify only one index with respect to dimension $d_3$, then the prefix-sum structure along dimension $d_3$ is not needed. Hence, the prefix-sum will only be calculated along dimensions $d_1$ and $d_2$. As a result, only $2^2-1=3$ steps is required for each range-sum query as opposed to $2^3-1=7$ steps.

The selection of a proper subset of the cube dimensions affects the performance of the range-sum method as follows. Let X be the set of d dimensions of the original data cube. Thus, |X|=d. We will choose a subset X' of X, where |X'|=d'. An attribute $a \in X$ is active with respect to a range-sum query q if the selection upon the attribute is a contiguous range in its domain and the range is neither a singleton (i.e., a single value in the domain) nor all. An attribute is passive with respect to a range-sum query q if it is not active. Given the range-sum query q, the best way of choosing X' among X is clearly to let X' contain exactly all active attributes with respect to q. However, given a set of m collected queries from an OLAP log, $Q=\{q_1, q_2, \ldots, q_m\}$, the best way of choosing X' among X that minimizes the overall query time complexity with respect to Q is an optimization problem.

Notice that a naive algorithm that gives an optimal solution requires a time complexity of $O(md2^d)$, with a simple time complexity lower bound of $O(md)$. A very simple heuristic algorithm of time complexity $O(md)$ is now described. Let $X=\{d_1, d_2, \ldots, d_d\}$. With respect to the query $q_i$ and attribute $d_j$, let $r_{ij}$ be the length of its range if the attribute is active, and be 1 if the attribute is passive. (Recall that for a passive attribute, its range is either all or of length 1). Then, Let $R_j = \Sigma_{i=1}^{m} r_{ij}$ for all $j \in D$. The subset X' of the dimensions is then equal to $X'=\{d_j | R_j \geq 2m\}$. FIG. 13 shows an example of the heuristic algorithm in choosing $X'=\{1, 2, 3\}$ from the set $X=\{1, 2, 3, 4, 5\}$.

The intuition behind the heuristic algorithm is as follows. For a given query $q_i$ and given attribute $d_j$, if $d_j \in X'$ then the time complexity factor for the query $q_i$ contributed by attribute $d_j$ is 2; otherwise it is $r_{ij}$. Note that this is a multiplicative factor. The heuristic algorithm is derived from a simplified assumption: the time complexity factor contributed by the product of all other attributes are the same for all queries.

Another optimization on the method of the invention may be made with respect to the selection of the block structure and the block factors to minimize storage space and response time. Given a d-dimensional data cube, a cuboid on k dimensions $\{d_{i1}, d_{i2}, \ldots, d_{ik}\}$ is defined as a group-by on the dimensions $d_{i1}, d_{i2}, \ldots, d_{ik}$. Group-by operations are described, for instance, by Agrawal et al. in "On the Computation of Multi-dimensional Aggregates," Proc. of the 22nd Int'l Conf. on Very Large Databases, pp. 506–521, India 1996. The cuboid corresponds to a slice of the cube where the remaining (d–k) dimensions have the value all.

Given a fixed amount of storage space, it is desirable to know for which cuboids the prefix-sums should be calculated and with what block factors in order to minimize the total response time. A greedy algorithm for choosing cuboids and block factors is provided below in the form of pseudo code.

```
// Greedy Algorithm
Answer = φ
while space < limit do begin
  for each cuboid ∉ Answer do
    Compute block sizes for best ratio of benefit to space.
  Add cuboid that resulted in the best benefit(space ratio to Answer
```

```
end
// Fine-tuning the output of the Greedy Algorithm
do
    for each cuboid ∈ Answer do
        Drop a X from Answer.
        for each cuboid ∉ V do      // V is the volume of the queried region
            Compute block sizes for best ratio of benefit to space;
        Add cuboid that resulted in the best benefit/space ratio to V.
    end
until no improvement.
```

The first half of the algorithm is a simple greedy search, similar to the algorithm described by Harinarayan et al in "Implementing Data Cube Efficiently," Proc. of the ACM SIGMOD Conf. on Management of Data, June 1996. Assume the greedy search first computed prefix-sum with block factor b for the cuboid $<d_1, d_2>$. If the greedy search later computes the prefix-sum for the cuboid $<d_1>$ with block factor b'<b, some other block factor b" may give a better benefit/space ratio for $<d_1, d_2>$. In fact, some other cuboid, say $<d_2, d_3>$ may now have a better benefit/space ratio than $<d_1, d_2>$ since the prefix-sum for $<d_1, d_2>$ no longer provides any benefit to the cuboid $<d_1>$.

Another aspect of the invention concerns the range-sum queries in the case the data cubes are not uniformly sparse. A data cube is not uniformly sparse when the non-zero cells do not distribute evenly in the data cube. In such a case, computing the blocked prefix-sums does not give an efficient solution because many block sums will remain zero even if the block factors are large. Two methods for performing range-sum queries when the cube is not uniformly sparse are now described: a special method for one-dimensional data cubes and a general method for higher-dimensional data cubes.

The One-Dimensional Case

When the block factor b=1, the array P has the same sparse structure as the array A. Given a range (l:h), it is necessary only to find out the first non-zero P[î] where $\hat{i} \geq l$ and the first non-zero P[ĥ] where $\hat{h} \leq h$. The values of ĥ and î can be determined using a B-tree index on P, such as those described by D. Comer in "The Ubiquitous B-tree," ACM Computing Surveys, No. 11 Vol. 2, pp. 121-138, June 1979. A similar solution applies to the case where b>1.

The d-Dimensional Case

We first find a set of non-intersecting rectangular dense regions. One approach to finding these regions would be to use clustering, such as the methods described by A. K. Jain et al. in "Algorithms For Clustering Data," Prentice Hall, 1988. However, clustering algorithms typically generate centers of clusters and hence the output of the clustering algorithm must be post-processed to generate rectangular regions. Preferably, a modified decision-tree classifier is used to find dense regions (non-empty cells are considered one class and empty cells another), such as the one described by J. Shafer et al. in "SPRINT: A Scalable Parallel Classifier For Data Mining," Proc. Of the 22nd Int'l Conference on Very Large Databases, India, 1996. The modification to the classifier is that the number of empty cells in a region are counted by subtracting the number of non-empty cells from the volume of the region. This lets the classifier avoid materializing the full data cube.

Once the dense regions have been found, the prefix-sum (or a blocked prefix-sum) for each dense region is computed. The boundary of each dense region is added to an R* tree, along with a pointer to the dense region. All points not in a dense region are also added to the R* tree. See, for example, "The R* tree: An Efficient and Robust Access Method for Points and Rectangles," Proc. Of ACM SIGMOD, pp. 322-331, May 1990.

Given a query, all dense regions that intersect the query can be found by searching the R* tree. For each such region, the prefix-sum is used to get the sum of the cells in the intersection of the dense region and the query. Finally, all points in the R* tree that lie within the query region are summed together to get the range sum.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer subsystem embodying the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for performing a range-sum query in a database in which data include a plurality of attributes and are represented as a d-dimensional data cube having a plurality of cells, the dimensions of the data cube corresponding respectively to the attributes, each cell having an aggregate value of the corresponding data attribute values, and the range-sum query including a range of values for each data attribute, the method comprising the steps of:

selecting a subset of the dimensions of the data cube;
   computing a plurality of prefix-sums along the selected dimensions, based on the aggregate values corresponding to the ranges of values of the data attributes; and
   generating a range-sum result based on the data represented by the computed prefix-sums.

2. The method as recited in claim 1, wherein the range-sum query corresponds to a d-dimensional region of the data cube.

3. The method as recited in claim 1, wherein the range-sum query is based on an aggregate binary operator for which an inverse aggregate binary operator exists, the operators being operational on the data of the database.

4. The method as recited in claim 1, wherein:

the data cube is represented as a d-dimensional array A;

the computed prefix-sums are represented as a d-dimensional array P, the arrays A and P each having $n_1 \times n_2 \times \ldots \times n_d$ cells, where d is the number of dimensions of the data cube; and the step of computing a plurality of prefix-sums includes the step of calculating:

$$P[x_1, x_2, \ldots x_d] = \text{Sum}(0: x_1, 0: x_2, \ldots, 0: x_d)$$

$$= \sum_{i_1=1}^{x_1} \sum_{i_2=1}^{x_2} \ldots \sum_{i_d=1}^{x_d} A[i_1, i_2, \ldots, i_d]$$

where $1 \leq x_j \leq n_j$, $1 \leq j \leq d$, and $n_j$ is the size of dimension j of the arrays A and P.

5. The method as recited in claim 4, wherein the step of computing a plurality of prefix-sums includes the steps of:

performing one-dimensional prefix-sums along dimension 1 of the array A for all the cells in the array A;

storing the one-dimensional prefix-sums of the array A into an array $P_1$;

for i=2 to d:
  (a) performing one-dimensional prefix-sums along dimension i of array $P_{i-1}$; and
  (b) storing the one-dimensional prefix-sums of the array $P_{i-1}$ into an array $P_i$; and assigning array $P_d$ to the prefix-sum array P.

6. The method as recited in claim 5, wherein:

the data cube includes a plurality of d-dimensional blocks each having $b_1 \times b_2 \times \ldots \times b_d$ cells, where $b_i$'s, for i=1 to d, are predetermined block factors; and the method further comprises the steps of:
  (a) for each block,
    (i) summing up the aggregate values corresponding to all the cells in the block into a block sum; and
    (ii) storing the block sum into one of the cells of the block, the array A of size $n_1 \times n_2 \times \ldots \times n_d$ now corresponding to a reduced array A' of size $n_1/b_1 \times n_2/b_2 \times \ldots \times n_d/b_d$ which includes the respective block sums for the blocks;
  (b) executing the steps of performing and storing one-dimensional prefix-sums on the array A'; and
  (c) outputting the prefix-sum array P as P'.

7. The method as recited in claim 6, wherein a subset of the block factors $b_i$'s, for $1 \leq i \leq d$, are equal to 1.

8. The method as recited in claim 6, wherein a subset of the block factors $b_i$'s, for $1 \leq i \leq d$, are equal to $n_i$.

9. The method as recited in claim 6, wherein the step of generating a range-sum result includes the steps of:

(i) for each dimension of the data cube, partitioning the range of values of the corresponding data attribute into three adjoining sub-ranges where the middle range is properly aligned with the blocks, the region of the data cube corresponding to the range-sum query thereby having $3^d$ disjoint sub-regions including an internal sub-region and $3^d-1$ boundary sub-regions $B_i$'s;

(ii) computing a range-sum for the internal sub-region based on the array P';

(iii) computing a range-sum for each boundary sub-region $B_i$, based on the arrays P' and A; and (iv) summing up the range-sums for all the $3^d$ sub-regions to arrive at the range-sum result.

10. The method for performing a range-sum query as recited in claim 9, wherein the step of computing a range-sum for each boundary sub-region $B_i$ includes the step of summing up all the cells of the array A corresponding to $B_i$.

11. The method for performing a range-sum query as recited in claim 9, wherein the step of computing a range-sum for each boundary sub-region $B_i$ includes the steps of:

computing a first sum from the cells of the array A which correspond to a superblock $S_i$ of the boundary sub-region $B_i$, the superblock $S_i$ being a minimum collection of the blocks that includes $B_i$;

computing a second sum from the cells of the array A which correspond to a complementary region $C_i$ of the boundary sub-region $B_i$, the complementary region $C_i$ being the difference between the superblock $S_i$ and the sub-region $B_i$; and subtracting the second sum from the first sum to arrive at the range-sum for the boundary sub-region $B_i$.

12. The method for performing a range-sum query as recited in claim 4, wherein the step of generating a range-sum result includes the step of calculating:

$$\text{Sum}(l_1:h_1, l_2:h_2, \ldots, l_d:h_d) =$$

$$\sum_{\forall x_j \in \{l_j, h_j\}} \left\{ \left( \prod_{i=1}^{d} s(i) \right) * P[x_1, x_2, \ldots, x_d] \right\},$$

$$\text{where } s(i) = \begin{cases} 1 & \text{if } x_i = h_i \\ -1 & \text{if } x_i = l_i \end{cases}$$

and the range of query for dimension i, for $1 \leq i \leq d$, is from $l_i+1$ to $h_i$, inclusively.

13. A computer program product for use with a computer system for performing a range-sum query in a database in which data include a plurality of attributes and are represented as a d-dimensional data cube having a plurality of cells, the dimensions of the data cube corresponding respectively to the attributes, each cell having an aggregate value of the corresponding data attribute values, and the range-sum query including a range of values for each data attribute, the computer program product comprising:

a computer-readable medium;

means, provided on the computer-readable medium, for directing the system to select a subset of the dimensions of the data cube;

means, provided on the computer-readable medium, for directing the system to compute a plurality of prefix-sums along the selected dimensions, based on the aggregate values corresponding to the ranges of values of the data attributes; and means, provided on the computer-readable medium, for directing the system to generate a range-sum result based on the data represented by the computed prefix-sums.

14. The computer program product as recited in claim 13, wherein the range-sum query corresponds to a d-dimensional region of the data cube.

15. The computer program product as recited in claim 13, wherein the range-sum query is based on an aggregate binary operator for which an inverse aggregate binary operator exists, the operators being operational on the data of the database.

16. The computer program product as recited in claim 13, wherein:

the data cube is represented as a d-dimensional array A;

the computed prefix-sums are represented as a d-dimensional array P, the arrays A and P each having $n_1 \times n_2 \times \ldots \times n_d$ cells, where d is the number of dimensions of the data cube; and the means for directing to compute a plurality of prefix-sums includes means, provided on the computer-readable medium, for directing the system to calculate:

$$P[x_1, x_2, \ldots, x_d] = \text{Sum}(0: x_1, 0: x_2, \ldots, 0: x_d)$$
$$= \sum_{i_1=1}^{x_1} \sum_{i_2=1}^{x_2} \ldots \sum_{i_d=1}^{x_d} A[i_1, i_2, \ldots, i_d]$$

where $1 \leq x_j \leq n_j$, $1 \leq j \leq d$, and $n_j$ is the size of dimension j of the arrays A and P.

17. The computer program product as recited in claim 16, wherein the means for directing to compute a plurality of prefix-sums includes:

means, provided on the computer-readable medium, for directing the system to perform one-dimensional prefix-sums along dimension 1 of the array A for all the cells in the array A;

means, provided on the computer-readable medium, for directing the system to store the one-dimensional prefix-sums of the array A into an array $P_1$;

means, provided on the computer-readable medium, for directing the system, for i=2 to d:
 (a) to perform one-dimensional prefix-sums along the dimension i of ii the array $P_{i-1}$; and
 (b) to store the one-dimensional prefix-sums of the array $P_{i-1}$ into an array $P_i$; and means, provided on the computer-readable medium, for directing the system to assign array $P_d$ to the prefix-sum array P.

18. The computer program product as recited in claim 17, wherein:

the data cube includes a plurality of d-dimensional blocks each having $b_1 \times b_2 \times \ldots \times b_d$ cells, where $b_i$'s, for i=1 to d, are predetermined block factors; and the computer program product further comprises:
 (a) for each block, means, provided on the computer-readable medium, for directing the system to:
  (i) sum up the aggregate values corresponding to all the cells in the block into a block sum; and
  (ii) store the block sum into one of the cells of the block, the array A of size $n_1 \times n_2 \times \ldots \times n_d$ now corresponding to a reduced array A' of size $n_1/b_1 \times n_2/b_2 \times \ldots \times n_d/b_d$ which includes the respective block sums for the blocks;
 (b) means, provided on the computer-readable medium, for directing the system to perform and store one-dimensional prefix-sums on the array A'; and
 (c) means, provided on the computer-readable medium, for directing the system to output the prefix-sum array P as P'.

19. The computer program product as recited in claim 18, wherein a subset of the block factors $b_i$'s, for $1 \leq i \leq d$, are equal to 1.

20. The computer program product as recited in claim 18, wherein a subset of the block factors $b_i$'s, for $1 \leq i \leq d$, are equal to $n_i$.

21. The computer program product as recited in claim 18, wherein the means for directing to generate a range-sum result includes:

(i) for each dimension of the data cube, means, provided on the computer-readable medium, for directing the system to partition the range of values of the corresponding data attribute into three adjoining sub-ranges where the middle range is properly aligned with the blocks, the region of the data cube corresponding to the range-sum query thereby having $3^d$ disjoint sub-regions including an internal sub-region and $3^d-1$ boundary sub-regions $B_i$'s;

(ii) means, provided on the computer-readable medium, for directing the system to compute a range-sum for the internal sub-region based on the array P';

(iii) means, provided on the computer-readable medium, for directing the system to compute a range-sum for each boundary sub-region $B_i$, based on the arrays P' and A; and (iv) means, provided on the computer-readable medium, for directing the system to sum up the range-sums for all the $3^d$ sub-regions to arrive at the range-sum result.

22. The computer program product as recited in claim 21, wherein the means for directing to compute a range-sum for each boundary sub-region $B_i$ includes means, provided on the computer-readable medium, for directing the system to sum up all the cells of the array A corresponding to $B_i$.

23. The computer program product as recited in claim 21, wherein the means for directing to compute a range-sum for each boundary sub-region $B_i$ includes:

means, provided on the computer-readable medium, for directing the system to compute a first sum from the cells of the array A which correspond to a superblock $S_i$ of the boundary sub-region $B_i$, the superblock $S_i$ being a minimum collection of the blocks that includes $B_i$;

means, provided on the computer-readable medium, for directing the system to compute a second sum from the cells of the array A which correspond to a complementary region $C_i$ of the boundary sub-region $B_i$, the complementary region $C_i$ being the difference between the superblock $S_i$ and the sub-region $B_i$; and means, provided on the computer-readable medium, for directing the system to subtract the second sum from the first sum to arrive at the range-sum for the boundary sub-region $B_i$.

24. The computer program product as recited in claim 16, wherein the means for directing to generate a range-sum result includes means, provided on the computer-readable medium, for directing the system to calculate:

$$\text{Sum}(l_1:h_1, l_2:h_2, \ldots, l_d:h_d) = \sum_{\forall x_j \in \{l_j, h_j\}} \left\{ \left( \prod_{i=1}^{d} s(i) \right) * P[x_1, x_2, \ldots, x_d] \right\},$$

$$\text{where } s(i) = \begin{cases} 1 & \text{if } x_i = h_i \\ -1 & \text{if } x_i = l_i \end{cases}$$

and the range of query for dimension i, for $1 \leq i \leq d$, is from $l_i+1$ to $h_i$, inclusively.

25. A database system for performing a range-sum query in a database in which data include a plurality of attributes and are represented as a d-dimensional data cube having a plurality of cells, the dimensions of the data cube corresponding respectively to the attributes, each cell having an aggregate value of the corresponding data attribute values, and the range-sum query including a range of values for each data attribute, the system comprising:

means for selecting a subset of the dimensions of the data cube;

means for computing a plurality of prefix-sums along the selected dimensions, based on the aggregate values corresponding to the ranges of values of the data attributes; and means for generating a range-sum result based on the data represented by the computed prefix-sums.

26. The system as recited in claim 25, wherein the range-sum query corresponds to a d-dimensional region of the data cube.

27. The system as recited in claim 25, wherein the range-sum query is based on an aggregate binary operator for which an inverse aggregate binary operator exists, the operators being operational on the data of the database.

28. The system as recited in claim 25, wherein:

the data cube is represented as a d-dimensional array A;

the computed prefix-sums are represented as a d-dimensional array P, the arrays A and P each having $n_1 \times n_2 \times \ldots \times n_d$ cells, where d is the number of dimensions of the data cube; and the means for computing a plurality of prefix-sums includes means for calculating:

$$P[x_1, x_2, \ldots x_d] = \text{Sum}(0\colon x_1, 0\colon x_2, \ldots, 0\colon x_d)$$
$$= \sum_{i_1=1}^{x_1} \sum_{i_2=1}^{x_2} \ldots \sum_{i_d=1}^{x_d} A[i_1, i_2, \ldots, i_d]$$

where $1 \leq x_j \leq n_j$, $1 \leq j \leq d$, and $n_j$ is the size of dimension j of the arrays A and P.

29. The system as recited in claim 28, wherein the means for computing a plurality of prefix-sums includes:

means for performing one-dimensional prefix-sums along dimension 1 of the array A for all the cells in the array A;

means for storing the one-dimensional prefix-sums of the array A into an array $P_1$;

for i=2 to d:
 (a) means for performing one-dimensional prefix-sums along the dimension i of array $P_{i-1}$; and
 (b) means for storing the one-dimensional prefix-sums of the array $P_{i-1}$ into an array $P_i$; and means for assigning array $P_d$ to the prefix-sum array P.

30. The system as recited in claim 29, wherein:

the data cube includes a plurality of d-dimensional blocks each having $b_1 \times b_2 \times \ldots \times b_d$ cells, where $b_i$'s, for i=1 to d, are predetermined block factors; and the system further comprises:
 (a) for each block,
  (i) means for summing up the aggregate values corresponding to all the cells in the block into a block sum; and
  (ii) means for storing the block sum into one of the cells of the block, the array A of size $n_1 \times n_2 \times \ldots \times n_d$ now corresponding to a reduced array A' of size $n_1/b_1 \times n_2/b_2 \times \ldots \times n_d/b_d$ which includes the respective block sums for the blocks;
 (b) means for executing the means for performing and means for storing one-dimensional prefix-sums on the array A'; and (c) means for outputting the prefix-sum array P as P'.

31. The system as recited in claim 30, wherein a subset of the block factors $b_i$'s, for $1 \leq i \leq d$, are equal to 1.

32. The system as recited in claim 30, wherein a subset of the block factors $b_i$'s, for $1 \leq i \leq d$, are equal to $n_i$.

33. The system as recited in claim 30, wherein the means for generating a range-sum result includes:

(i) for each dimension of the data cube, means for partitioning the range of values of the corresponding data attribute into three adjoining sub-ranges where the middle range is properly aligned with the blocks, the region of the data cube corresponding to the range-sum query thereby having $3^d$ disjoint sub-regions including an internal sub-region and $3^d-1$ boundary sub-regions $B_i$'s;

(ii) means for computing a range-sum for the internal sub-region based on the array P';

(iii) means for computing a range-sum for each boundary sub-region $B_i$, based on the arrays P' and A; and (iv) means for summing up the range-sums for all the $3^d$ sub-regions to arrive at the range-sum result.

34. The system as recited in claim 33, wherein the means for computing a range-sum for each boundary sub-region $B_i$ includes means for summing up all the cells of the array A corresponding to $B_i$.

35. The system as recited in claim 33, wherein the means for computing a range-sum for each boundary sub-region $B_i$ includes:

means for computing a first sum from the cells of the array A which correspond to a superblock $S_i$ of the boundary sub-region $B_i$, the superblock $S_i$ being a minimum collection of the blocks that includes $B_i$;

means for computing a second sum from the cells of the array A which correspond to a complementary region $C_i$ of the boundary sub-region $B_i$, the complementary region $C_i$ being the difference between the superblock $S_i$ and sub-region $B_i$; and means for subtracting the second sum from the first sum to arrive at the range-sum for the boundary sub-region $B_i$.

36. The system as recited in claim 28, wherein the means for generating a range-sum result includes means for calculating:

$$\text{Sum}(l_1\colon h_1, l_2\colon h_2, \ldots, l_d\colon h_d) =$$

$$\sum_{\forall x_j \in \{l_j, h_j\}} \left\{ \left( \prod_{i=1}^{d} s(i) \right) * P[x_1, x_2, \ldots, x_d] \right\},$$

$$\text{where } s(i) = \begin{cases} 1, \text{ if } x_i = h_i \\ -1, \text{ if } x_i = l_i \end{cases}$$

and the range of query for dimension i, for $1 \leq i \leq d$, is from $l_i+1$ to $h_i$, inclusively.

* * * * *